United States Patent
Ramaswamy (10) Patent No.: US 9,672,627 B1
(45) Date of Patent: Jun. 6, 2017

(54) MULTIPLE CAMERA BASED MOTION TRACKING

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 13/891,036

(22) Filed: May 9, 2013

(51) Int. Cl.
*G06K 9/36* (2006.01)
*G06T 7/00* (2006.01)

(52) U.S. Cl.
CPC ................... *G06T 7/004* (2013.01)

(58) Field of Classification Search
CPC . G06F 3/017; G06F 1/32; G06T 7/004; G06T 7/20; G06T 2207/10004
See application file for complete search history.

(56) References Cited

U.S. PATENT DOCUMENTS

| | | | | |
|---|---|---|---|---|
| 5,696,503 | A * | 12/1997 | Nasburg | 340/933 |
| 5,801,943 | A * | 9/1998 | Nasburg | 701/117 |
| 7,712,657 | B1 * | 5/2010 | Block et al. | 235/379 |
| 8,723,789 | B1 * | 5/2014 | Rafii | G06F 3/011 345/156 |
| 8,788,977 | B2 * | 7/2014 | Bezos | 715/863 |
| 8,830,302 | B2 * | 9/2014 | Im | H04N 13/0207 348/42 |
| 9,129,400 | B1 * | 9/2015 | Ivanchenko | G06T 7/2053 |
| 9,439,736 | B2 * | 9/2016 | Olson | G06T 19/003 |
| 9,471,153 | B1 * | 10/2016 | Ivanchenko | G06F 3/017 |
| 2003/0053661 | A1 * | 3/2003 | Magarey | 382/103 |
| 2006/0050952 | A1 * | 3/2006 | Blais et al. | 382/154 |
| 2006/0115126 | A1 * | 6/2006 | Watanabe et al. | 382/106 |
| 2008/0013793 | A1 * | 1/2008 | Hillis | G03H 1/0005 382/114 |
| 2008/0089587 | A1 * | 4/2008 | Kim et al. | 382/190 |
| 2009/0256809 | A1 * | 10/2009 | Minor | G06F 3/03547 345/173 |
| 2010/0060570 | A1 * | 3/2010 | Underkoffler et al. | 345/156 |
| 2010/0125816 | A1 * | 5/2010 | Bezos | 715/863 |
| 2010/0204953 | A1 * | 8/2010 | Onishi et al. | 702/150 |
| 2010/0277420 | A1 * | 11/2010 | Charlier | G06F 3/0481 345/173 |
| 2010/0289632 | A1 * | 11/2010 | Seder et al. | 340/436 |

(Continued)

*Primary Examiner* — Chan Park
*Assistant Examiner* — Mia M Thomas
(74) *Attorney, Agent, or Firm* — Polsinelli LLP (57) ABSTRACT

A computing device with multiple image capture elements can selectively activate those elements in order to keep an object of interest within the field of view of at least one of those elements, while conserving resources by not keeping all the image capture elements active. The object can be located using an appropriate object recognition process. The location, and thus the motion, of the object then can be tracked over time using one or the image capture elements. The motion can be monitored to determine when the object is likely to pass into the field of view of another image capture element. The determination can be made based upon factors such as location, direction, speed, acceleration, and predicted time within the current field of view. Such an approach allows an identified object to be tracked and kept in a field of view while conserving resources on the device.

20 Claims, 6 Drawing Sheets

(56) References Cited

U.S. PATENT DOCUMENTS

| | | | |
|---|---|---|---|
| 2011/0135148 A1* | 6/2011 | Hsiao et al. | 382/103 |
| 2012/0140072 A1* | 6/2012 | Murashita et al. | 348/148 |
| 2012/0206331 A1* | 8/2012 | Gandhi | G06F 9/445 345/156 |
| 2013/0082978 A1* | 4/2013 | Horvitz | G06F 3/017 345/175 |
| 2013/0222288 A1* | 8/2013 | Lim | G06F 3/041 345/173 |
| 2013/0225999 A1* | 8/2013 | Banjanin | A61B 8/467 600/443 |
| 2013/0229508 A1* | 9/2013 | Li | G06F 1/3287 348/77 |
| 2014/0009623 A1* | 1/2014 | Lai et al. | 348/169 |
| 2014/0037135 A1* | 2/2014 | Kutliroff et al. | 382/103 |
| 2014/0043234 A1* | 2/2014 | Eilat | G06F 3/017 345/158 |
| 2014/0053115 A1* | 2/2014 | Perski | G06F 3/017 715/863 |
| 2014/0118257 A1* | 5/2014 | Baldwin | G06F 3/017 345/158 |
| 2014/0157209 A1* | 6/2014 | Dalal | G06F 3/017 715/863 |
| 2014/0267142 A1* | 9/2014 | MacDougall | G06F 3/017 345/174 |
| 2014/0285435 A1* | 9/2014 | Bezos | 345/156 |
| 2014/0300564 A1* | 10/2014 | Yoshino | 345/173 |
| 2015/0022439 A1* | 1/2015 | Alameh | G06F 3/0304 345/156 |
| 2016/0125234 A1* | 5/2016 | Ota | G06T 7/20 382/103 |
| 2016/0267708 A1* | 9/2016 | Nistico | H04N 13/0022 |
| 2016/0310228 A1* | 10/2016 | Maeda | G06T 7/70 |
| 2016/0320855 A1* | 11/2016 | Katz | G06F 3/011 |

* cited by examiner

MULTIPLE CAMERA BASED MOTION TRACKING

BACKGROUND

People are increasingly interacting with computers and other electronic devices in new and interesting ways. One such interaction approach involves making a specified motion with respect to a device, which can be detected in a field of view of a camera on the device. Since cameras have limited fields of view, it can be desirable to utilize multiple cameras to attempt to increase the effective field of view to be able to capture a larger range of motion. Unfortunately, continually capturing and analyzing images using multiple cameras can come with significant processing and power requirements, which can be particularly undesirable for portable computing devices with limited resources.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing input to an electronic device. In particular, various embodiments enable a computing device to selectively activate cameras in order to track an object as that object passes between the fields of view of different cameras on the device. Various embodiments can analyze information such as the location, speed, and direction of motion of the object to attempt to predict when and if the object will pass out of the field of view of the currently active camera. The device can then activate the appropriate camera(s) to keep the object in the field of view of an active camera and continue tracking the object, and can deactivate a camera when the object is no longer in the field of view of that camera, or at least has appeared in the field of view of another camera on the device. Various other timing or activation determinations can be used as well. Such an approach can enable the device to continually track the object while using only a portion (i.e., one or more) of the cameras (or other sensors) on the device. The motion of the object can be used for any of a number of purposes, such as to provide motion or gesture input to the device.

Various other applications, processes, and uses are presented below with respect to the various embodiments.

Figure 1A:
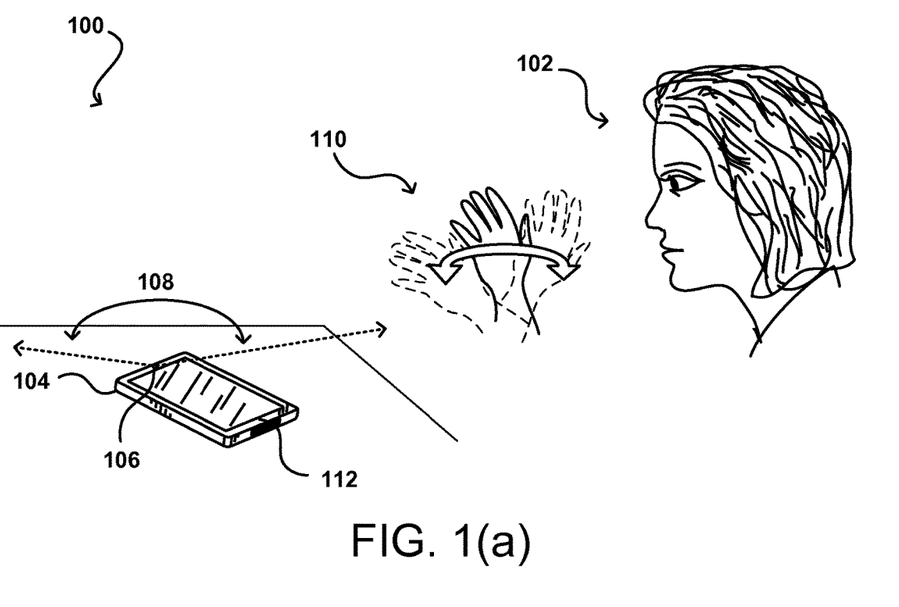
FIGS. 1(a) and 1(b) illustrate an example environment in which various aspects can be implemented using a computing device in accordance with various embodiments.

FIG. 1(a) illustrates an example situation 100 wherein a user 102 would like to provide gesture- and/or motion-based input to a computing device 104, such as to provide input to scroll through information in a Web browser, flip to the next page in an electronic book ("e-book"), or perform another such action. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, wearable computers (e.g., watches or glasses), cellular phones, video gaming consoles or controllers, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's hand 110. The motion can be one of a set of motions or gestures recognized by the device to correspond to a particular input or action, or can be a specific motion or gesture associated with that particular user. If the motion is performed within a field of view, viewable area, or angular range 108 of at least one imaging element 106 on the device, the device can capture image information including at least a portion of the motion or gesture, analyze the image information using at least one image analysis, feature recognition, or other such algorithm, and determine movement of at least one feature of the user between subsequent frames or portions of the image information. This can be performed using any process known or used for determining motion, such as locating "unique" features in one or more initial images and then tracking the locations of those features in subsequent images, whereby the movement of those features can be compared against a set of movements corresponding to the set of motions or gestures, etc. In some embodiments, a display screen 112 of the computing device can be a capacitive display allowing for non-contact input by a user when a feature of the user (e.g., a fingertip) is within a detectable range (e.g., 3-5 cm.) of the display. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference.

Figure 1B:
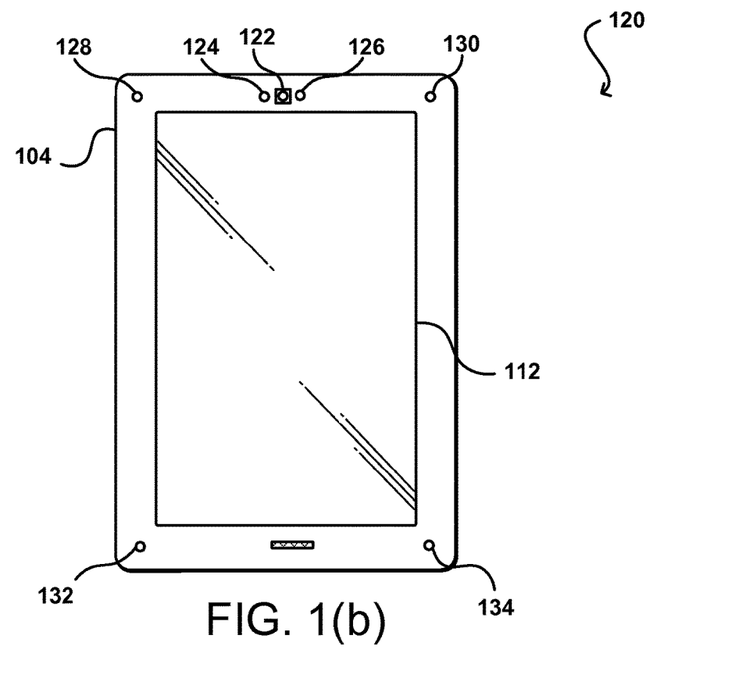

FIG. 1(b) illustrates a view 120 of an example computing device 104, such as that illustrated in FIG. 1(a), that can be used to determine and/or utilize motion or gesture input in accordance with various embodiments. In this example, the device has a conventional digital camera 122 on a same side of the device as a display element 112, enabling the device to capture image information about a user of the device during typical operation where the user is at least partially in front of the display element. In addition, there is a light sensor 124 positioned on the same side of the device that can be used to determine an amount of ambient light in the direction of the camera, and a light source 126, such as a white light LED, operable to provide additional illumination where necessary to provide for adequate image capture, as may be determined based at least in part upon information obtained from the light sensor. Such a configuration can useful in many situations, but it should be understood that there can be additional or fewer cameras, sensors, or other such elements on the same or other sides or locations of the device as well within the scope of the various embodiments, such as may enable gesture or image input from any desired direction or location with respect to the device. This example device also includes a set of four gesture sensors 128, 130, 132, 134 each operable to capture an image of at least a portion of an object over a field of view of the respective gesture sensor. Each gesture sensor can be a camera, for example, which in some embodiments can be lower resolution or have a lower color depth and/or power requirement than the conventional digital camera 122. The gesture sensors also can operate at different frame rates or different gain settings than the conventional camera, among other such differences. In some embodiments, the higher resolution camera 122 might be used to recognize or identify a feature, such as the hand, head, or finger of a user. Once the location of that feature is determined, one or more of the gesture sensors 128, 130, 132, 134 can be used to track the relative position of that feature over time. In other embodiments, the feature can instead be recognized using at least one of the gesture sensors, among other such options.

Figure 2A:
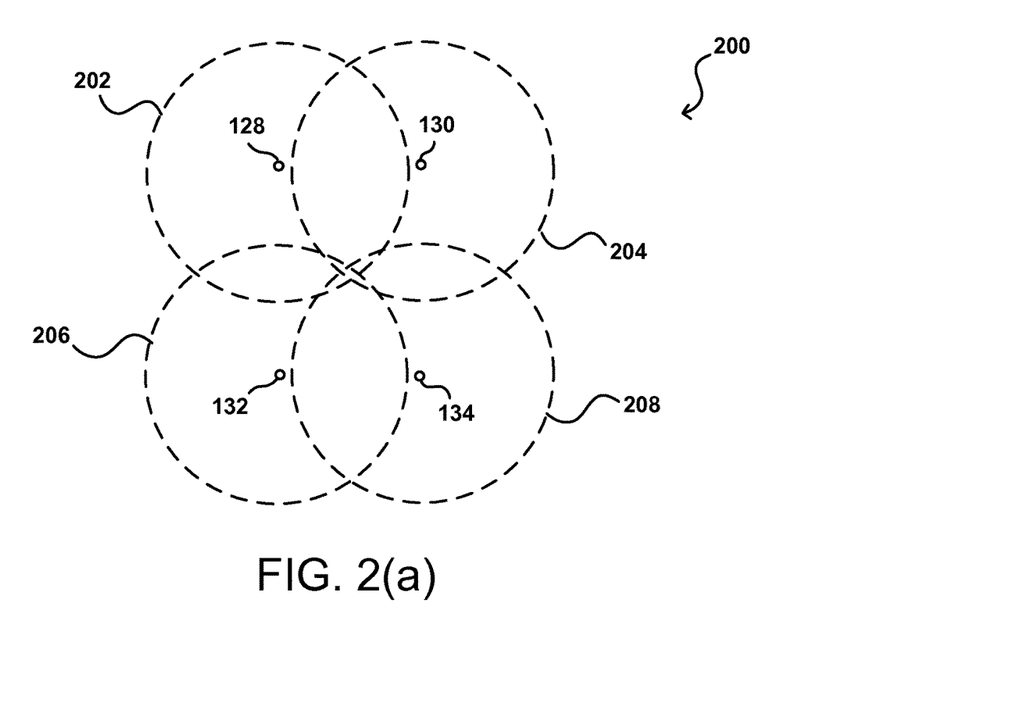
FIGS. 2(a) and 2(b) illustrate example fields of view that can be utilized for purposes of motion tracking in accordance with various embodiments.

Each of the gesture sensors typically will have a lens that defines the possible field of view of the respective gesture sensor. For many conventional lenses, a somewhat hemispherical lens typically defines a circular field of view. As illustrated in the example situation 200 of FIG. 2(*a*), each of the gesture sensors 128, 130, 132, 134 can be arranged such that their combined fields of view 202, 204, 206, 208 at least partially overlap, creating a substantially continuous and larger effective field of view. By configuring the fields of view to at least partially overlap as illustrated, there are no gaps or "dead zones" between the fields of view, assuming that the cameras stay relatively aligned. In some embodiments, additional overlap might be provided to allow for slight misalignments without creating dead zones. By not allowing for dead zones, any object that moves from one field of view (based on motion of the object and/or the device) to another can be tracked without getting lost or being unable to be viewed for a period of time.

Figure 2B:
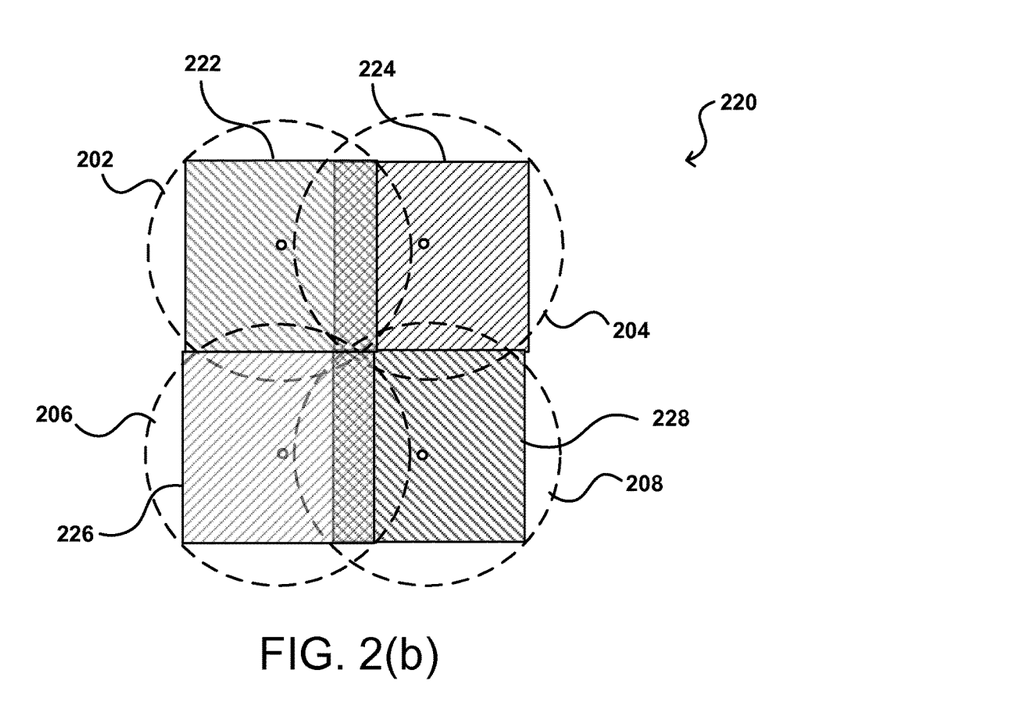

For many gesture sensors, the actual sensor will be comprised of many pixels arranged in a square or rectangular array. The actual field of view for each gesture sensor is defined by a combination of the lens and the sensor array, as the field of view is the effective area of the sensor as "altered" by the lens, due to the lens bending light directed toward the respective sensor. Thus, as illustrated in the situation 220 of FIG. 2(*b*), the effective fields of view can actually correspond more to substantially square regions 222, 224, 226, 228 within the fields of view 202, 204, 206, 208 established by the lenses. While in some embodiments the sensors might extend beyond the field of view of the respective lens, such a design would result in pixels that would not receive a significant amount of light directed through the lens, resulting in unused pixels and, thus, wasted cost and space on the device. In such a situation, the effective fields of view 222, 224, 226, 228 can be configured to at least partially overlap, or at least have no significant gaps there between, in order to allow for continual tracking of an object or feature within the combined fields of view.

Figure 3A:
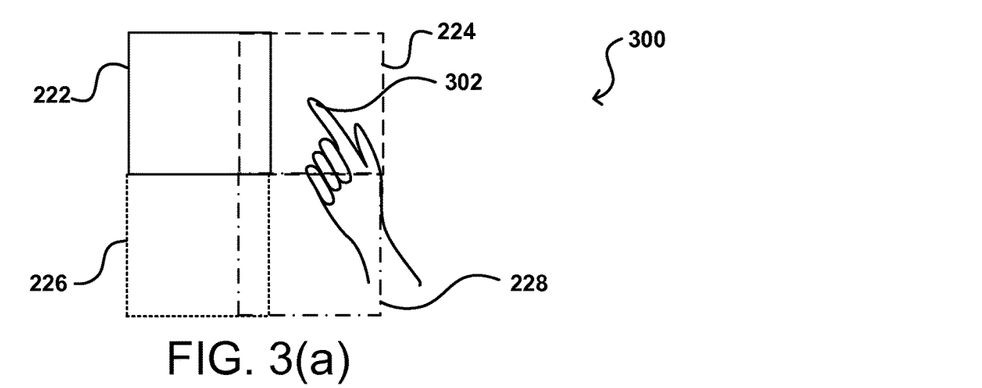
FIGS. 3(a), 3(b), and 3(c) illustrate examples of motions that can cause different cameras to be activated in accordance with various embodiments.

As an example, FIG. 3(*a*) illustrates a situation 300 wherein a feature, in this case the fingertip 302 of a user, is located within the field of view 224 of one of the gesture sensors, which is currently active. The field of view for an active gesture sensor will sometimes be referred to herein as the "active" field of view for convenience. The fingertip can be recognized using any appropriate process, such as may utilize object recognition, pattern recognition, feature location, and the like, as discussed elsewhere herein. That gesture sensor can be used to track the fingertip as long as at least a sufficient portion of the fingertip is visible within the corresponding field of view 224. For two-dimensional gesture or feature tracking, for example, a single camera can be sufficient to track the relative position. Thus, it can provide a significant power and processing savings to only utilize the gesture sensor corresponding to the field of view 224 in which the finger can be viewed. Accordingly, approaches in accordance with various embodiments can deactivate, or otherwise change an operational state of, the other gesture sensors corresponding to the other fields of view 222, 226, 228. In some embodiments, the operational state can correspond to a lower power state or standby state. In other embodiments, the other gesture sensors might remain in a conventional operational state, but the data captured might not be analyzed other than for the gesture sensor currently being used to track the feature. Various other options can be utilized as well to attempt to conserve power, processing capacity, memory space, bandwidth, and/or other such aspects.

Figure 3B:
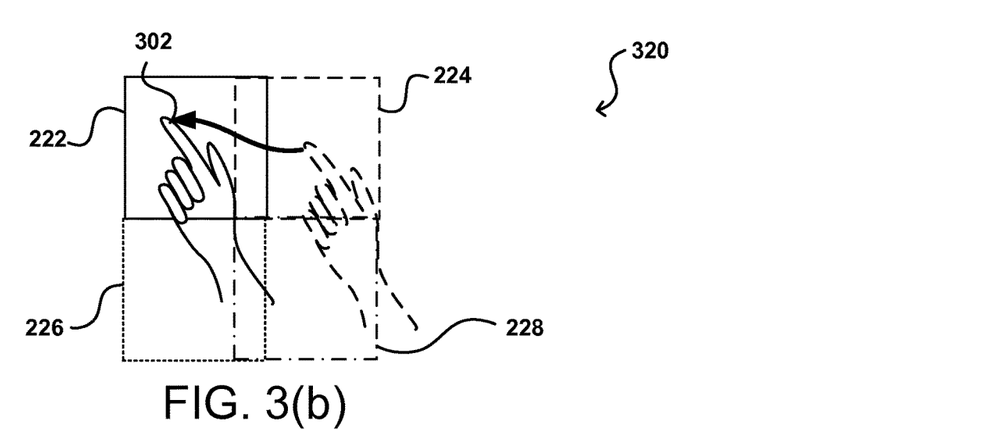

At some point, however, the feature might move to a location that is no longer in that field of view 224. For example, FIG. 3(*b*) illustrates a situation 320 wherein the fingertip has moved from the first field of view 224 to a second field of view 222 associated with a different gesture sensor. It would be desirable to be able to activate the gesture sensor associated with the second field of view 222 and deactivate the gesture sensor associated with the first field of view 224 when the fingertip passes from the first field of view 224 to the second field of view 222. For many conventional sensors there is some latency at activation, or a period of time that it takes between the instruction to activate and the actual time at which a gesture sensor is ready to capture image data. If the activation is done when the fingertip 302 leaves the first field of view, there will be a period of time wherein the fingertip cannot actively be tracked. This can be undesirable for a number of reasons. For example, the fingertip might move back toward the first field of view 224 during that period, which can cause the device to at least temporarily "lose" the portion of the finger, as the finger would not be in the field of view of an active gesture sensor. Such an approach then could require, in at least some embodiments, all gesture sensors or one or more additional cameras to be activated to attempt to locate the fingertip. Further, if the finger is lost for a period of time during the latency period then a more detailed recognition process might be needed to locate the finger, as its precise position will not be known and it is undesirable to inadvertently identify and track the wrong object.

Accordingly, approaches in accordance with various embodiments can attempt to predict when a feature is likely to move into a second field of view and activate the corresponding gesture sensor with sufficient time to enable the feature to be visible in the second field of view before the feature has left the first field of view. Such an approach can prevent the feature from being "lost" for a period of time, and enables the feature to be located quickly as the current relative position is known, avoiding the need for a more robust recognition process. Various other advantages can be obtained as well.

For example, in FIG. 3(*b*) it would be possible to activate the gesture sensor associated with the second field of view 222 when the fingertip 302 is determined, using the information from the first field of view 224, to be at a location that is at, or within, the bounds of the second field of view 222. Thus, due at least in part to the overlap between the first and second fields of view, the sensor can be ready to capture data before the fingertip leaves the first field of view 224. In another embodiment, each field of view might have a threshold distance from the edge of the field of view that is designated as the activation threshold, wherein a feature reaching that threshold distance will cause the gesture sensor for the appropriate adjacent field of view to be activated. Such an approach can potentially result in the activation of gesture sensors that are not needed, such as where the tracked feature does not actually enter the predicted field of view, but such an approach avoids losing the feature and still requires significantly less power than running all gesture sensors in an active or similar mode.

Deactivating a gesture sensor can utilize at least some similar approaches. For example, a gesture sensor can be deactivated when a feature is no longer in the field of view of that gesture sensor, or when that feature is detected in the field of view of another gesture sensor. If a sensor is activated but the feature does not enter the corresponding field of view for at least a determined amount of time, the sensor can be deactivated again. In other embodiments, a sensor might only be deactivated after the feature has moved, and remained, out of the field of view for at least a determined amount of time. Various other approaches or determinations can be used as well within the scope of the various embodiments.

In many cases, however, fixed thresholds, distances, and/or times can be insufficient to allow for sufficient activation time or prevent feature loss for at least some devices. For example, a faster motion or gesture may cross into a different field of view in less time than a slower motion or gesture. If a threshold distance is used, the threshold must allow for fast gestures in order to avoid losing the object, which means that the threshold will be a larger distance from the edge of the field of view. In most cases, however, this will be more distance than is needed, which can require the adjacent camera being active substantially more than is needed.

Approaches in accordance with various embodiments attempt to determine not only whether a feature is likely to move into another field of view, but also how long it likely will take based on the current rate of motion, acceleration, or other such aspect. By determining the amount of time it will likely take for the feature to enter another field of view, and by comparing this against the latency period for activating a gesture sensor (or other such image capture element), an activation time and/or distance can be determined that is more accurate for the current motion. For example, assume that the fingertip 302 in FIG. 3(b) is moving at a rate of approximately 20 cm per second (although for 2D motion the rate might be measured in pixels per unit time or another such measure). If the latency period for the camera is 100 ms then the second gesture sensor should be activated when the fingertip 302 is no less than 2.0 cm from the edge of the first field of view 224. In order to allow for some amount of error, as well as variation in the user motion, a threshold such as 1.5× might be used, such that the second gesture sensor for the second field of view 222 would be activated when, at the current rate of motion, the fingertip reached 0.3 cm from the edge of the second field of view. Various other factors and thresholds can be used as well within the scope of the various embodiments. Since the motion will generally not be directly toward a field of view along a straight line, the factor also can be increased to allow for angular or non-linear motion, or the component of the motion toward the field of view can be determined, among other such options.

Figure 3C:
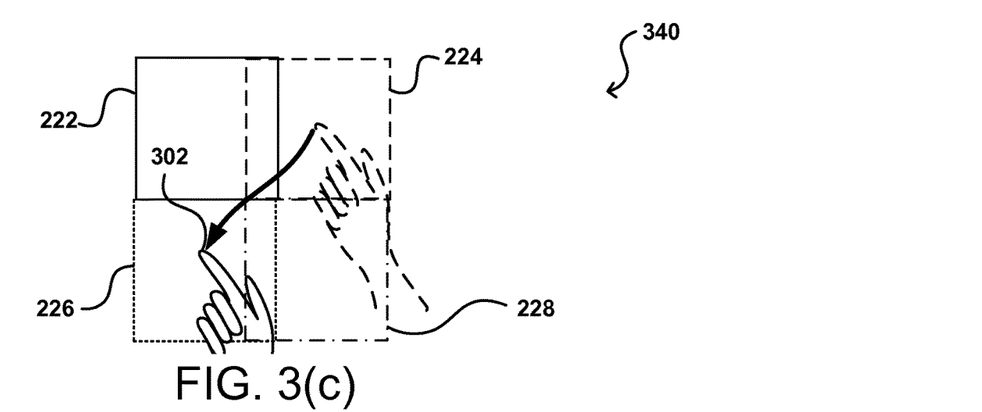

In some cases, the motion might cause more than one gesture sensor to be activated. For example, consider the situation 340 of FIG. 3(c). In this example, the motion of the fingertip 302 is a non-linear motion that is moving towards two potential fields of view 222, 226. It may be too difficult to determine which of the fields of view will ultimately contain a representation of the fingertip until it is too late for latency purposes. Thus, when a motion is towards more than one field of view, is likely to pass within a threshold distance of a field of view, or there is a minimum level of confidence that the motion will carry the feature into either field of view, for example, both gesture sensors for the fields of view 222, 226 can be activated. While such activation will generally utilize more resources than is necessary, such activation can also help to ensure that the fingertip 302 is not lost during the motion. In some embodiments, the motion of the fingertip 302 in FIG. 3(c) is close enough to the other three fields of view 222, 226, 228 such that each of the other gesture sensors might be activated, as the fingertip might change direction quickly into any of the fields of view. A balance can be made between risk of losing the tracking, at least temporarily, and activating more gesture sensors, or activating them sooner, to improve tracking but at a cost of greater resource consumption.

A similar approach can be taken for stereoscopic imaging. For stereoscopic imaging, a pair of cameras will be active at any given time in order to track a motion or gesture in three dimensions. For example, in FIG. 3(a) the fingertip 302 could be tracked in three dimensions using fields of view 222 and 224 or fields of view 224 and 228 (although for stereoscopic imaging the fields of view would overlap much more as a feature must be visible in at least two fields of view concurrently in order to obtain the appropriate amount of disparity). As the fingertip 302 moves in FIG. 3(b), the active pair can remain fields 222 and 224 if active, or if the active fields were 224 and 228 then the active fields of view can change to 222 and 224. It can be appreciated that fields 222 and 226 could also be activated to track the fingertip, but leaving 224 active would allow the finger to remain visible in at least one active field of view, which can help to track the fingertip in the case of unexpected changes in motion, etc. In the situation of FIG. 3(c), field 226 can be activated in response to the motion. For devices that can only handle disparity in horizontal or vertical directions, for example, field 222 or 228 would have to also be active to provide disparity information. If the device is capable of determining disparity using pairs of cameras at other orientations, then field 224 can remain active and field 226 activated. Various other approaches can be used as well.

Figure 4:
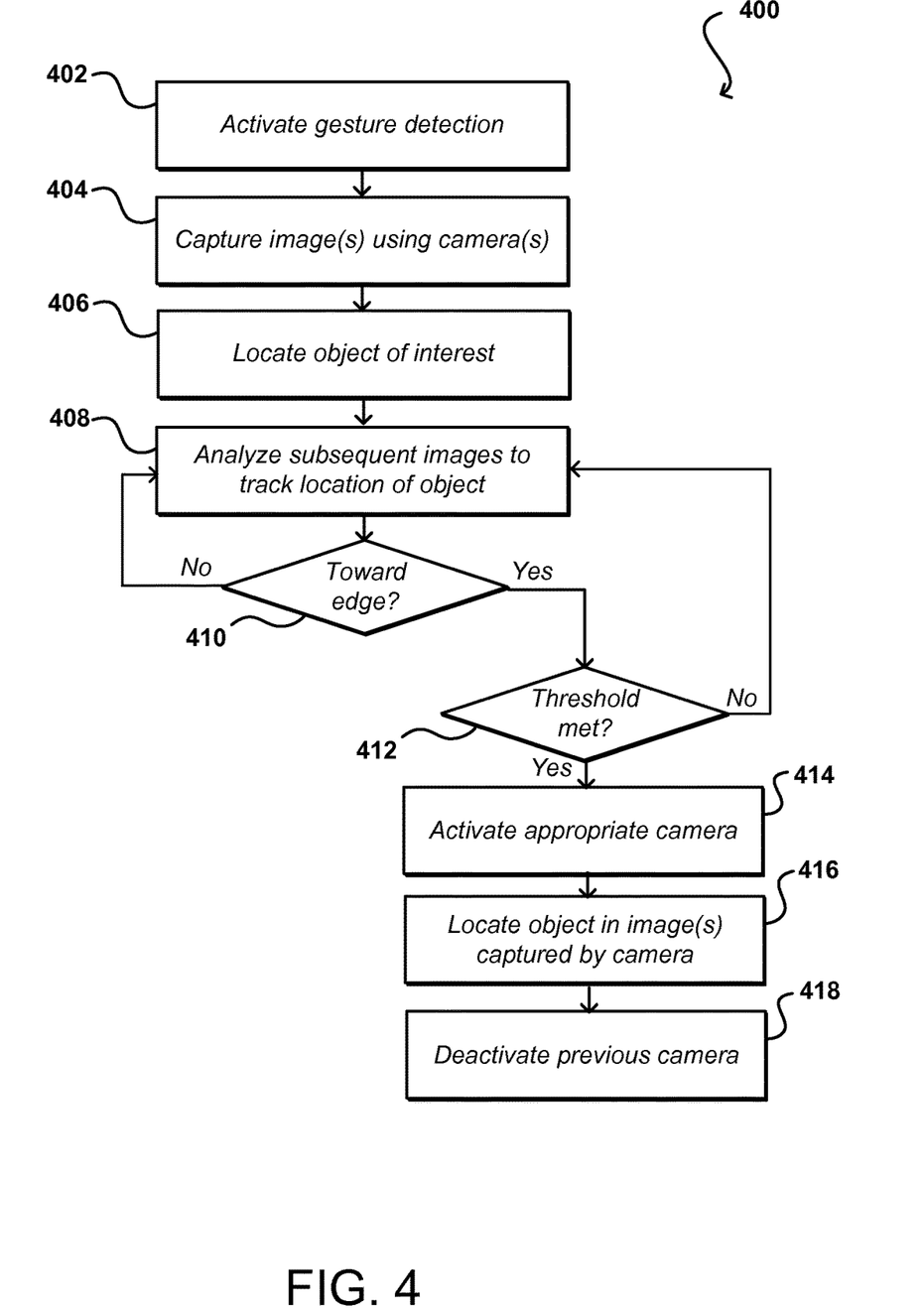
FIG. 4 illustrates an example process for selectively activating and deactivating cameras to track motion that can be performed in accordance with various embodiments.

FIG. 4 illustrates an example process 400 for determining motion and/or gesture input that can be used in accordance with various embodiments. It should be understood that, for any process discussed herein, there can be additional, fewer, or alternative steps performed in similar or alternative orders, or in parallel, within the scope of the various embodiments unless otherwise stated. In this example, gesture detection 402 is activated on a computing device. It should be understood that other processes or applications such as motion detection, object tracking, and the like can be utilized as well within the scope of the various embodiments. One or more images (or frames of video) can be captured 404 using one or more cameras, gesture sensors, or other such image capture elements. An object or feature of interest, such as the hand, head, or finger of a user, or an object being held by a user, can then be located 406 by analyzing at least a portion of the one or more images. As discussed, a high resolution camera can be used to attempt to locate the object, a set of gesture sensors can each be activated to attempt to locate the object, etc. Further, any appropriate object recognition process or algorithm can be used to attempt to identify the object or feature in at least one of the images. The object can be a specific object, or a type or class of object, which can be identified by a user, indicated by an application or service provider, or otherwise specified.

Once an object of interest is located, subsequent images can be captured and analyzed 408 in order to track the location of the object over time. The camera(s) used can include some, all, or none of the cameras used to initially identify and locate the object. As discussed, in some embodiments a single gesture sensor can be utilized to track the object while the object is represented in the field of view of that gesture sensor. A determination can be made 410 as to whether the object is moving toward an edge of the currently active field of view. The determination of whether the object is moving "toward" the edge can be strictly based on motion in a given direction, or can also include a rate of speed, distance from the edge, or other such information. If not, the tracking of the object can continue using the currently active gesture sensor and the associated field of view. If the object is determined to be moving toward an edge of the currently active field of view, another determination can be made 412, either separately or as part of a single determination, as to whether an activation threshold or criterion has been met. For example, a determination can be made as to whether the object is within a threshold distance from another field of view, moving at a rate that can bring the object to within another field of view in a determined amount of time, etc. If not, the tracking with the active field of view can continue. If the threshold or criterion is met, the appropriate camera(s) or gesture sensor(s) for the determined field(s) of view can be activated 414, in order to be able to continue to track the object if the object substantially continues along its current path of motion and passes out of the active field of view. The object can subsequently be located 416 in an image captured by one of the gesture sensors, either the previously active gesture sensor or a newly activated gesture sensor. As discussed, the locating can use another object recognition process or can be based on position knowledge of the object obtained from the previously activated gesture sensor, among other such options. Once the object is located in the newly activated field of view, the previously activated camera or gesture sensor can be deactivated 418, or otherwise transitioned into a low power, standby, or other such state. As mentioned, the deactivation may come after a period of time when the object is located in another field of view, after the object has passed at least a determined distance into the other field of view, etc.

Such approaches can be used for other types of object tracking as well. For example, a user might utilize an "augmented" reality application that displays video on a display screen as it is being captured by at least one camera on the device. If the device recognizes an object in the video, the device can cause information to be "overlaid" on top of the video in the display, such as to list pricing or detail information about the object. In order to have the information correspond to the location of the object, the location of the object has to be determined. Since the object might move, or the user might move the portable computing device, for example, the location of the object as represented in the video might move. It thus can be desirable to track the object over time. Similarly, it can be desirable to keep that object in the field of view of at least one camera on the device. Using approaches such as those discussed above, the cameras can be dynamically and/or selectively activated in order to automatically keep the object within the field of view of at least one image capture element (as long as the object is located within a potential field of view of at least one such element). Motion sensors such as accelerometers and gyroscopes can be used to distinguish device motion from object motion, which can be used to attempt to better determine which image capture elements to activate, predict the motion of the object, etc.

The tracking of an object using the captured image data can be performed using any of a number of image recognition or other such approaches. In some embodiments, the tracking can be performed using a fast correlation tracker, or a fast Fourier transform correlation tracker. In some embodiments, the nature of the motion of an object can be modeled using a Kalman filter, or linear quadratic estimation (LQE), assuming a relatively smooth trajectory. As mentioned previously, if the device includes a motion sensor then the motion in the image due to the device can be disambiguated from the motion of the object being tracked, which can help with motion tracking and estimation in at least some embodiments. Such approaches can be used to transfer bounding boxes, around the objects of interest, between fields of view during a handoff. Knowing the location information for the object as well as any misalignment of the cameras or sensors can help to track an object once identified and located, as the initial identifying can be much more difficult and resource consuming than tracking changes in the location of that object over time.

Figure 5:
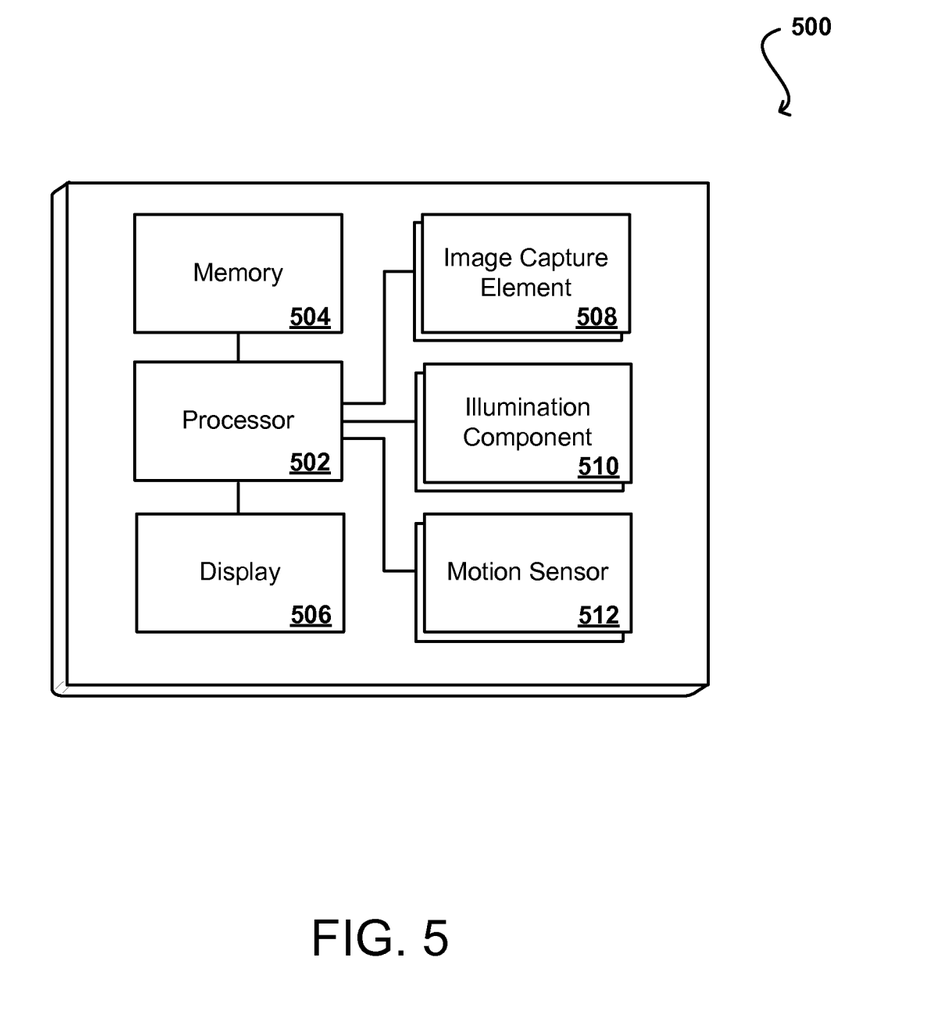
FIG. 5 illustrates an example configuration of components of a computing device such as that illustrated in FIG. 1(b)

In order to provide various functionality described herein, FIG. 5 illustrates an example set of basic components of a computing device 500, such as the device 120 described with respect to FIG. 1(*a*). In this example, the device includes at least one central processor 502 for executing instructions that can be stored in at least one memory device or element 504. As would be apparent to one of ordinary skill in the art, the device can include many types of memory, data storage or computer-readable storage media, such as a first data storage for program instructions for execution by the processor 502, the same or separate storage can be used for images or data, a removable storage memory can be available for sharing information with other devices, etc. The device typically will include some type of display element 506, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 508, such as one or more cameras that are able to image a user, people, or objects in the vicinity of the device. In at least some embodiments, a device can use these elements to concurrently track multiple objects or features, such as fingers or hands. An image capture element can include, or be based at least in part upon any appropriate technology, such as a CCD or CMOS image capture element having a determined resolution, focal range, viewable area, and capture rate. The device can also include one or more gesture sensors, such as an ambient light or IR sensor or detector, operable to capture information for use in determining gestures or motions of the user, which will enable the user to provide input through the portable device without having to actually contact and/or move the portable device. The device also include at least one illumination element 510, as may include one or more light sources (e.g., white light LEDs, IR emitters, or flashlamps) for providing illumination and/or one or more light sensors or detectors for detecting ambient light or intensity, etc. The device can also include at least one motion sensor 512 for use in detecting device motion, which then can be disambiguated from object motion. The motion sensor can include, for example, an accelerometer, a gyroscope, an inertial sensor, an electronic compass, and the like.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 6:
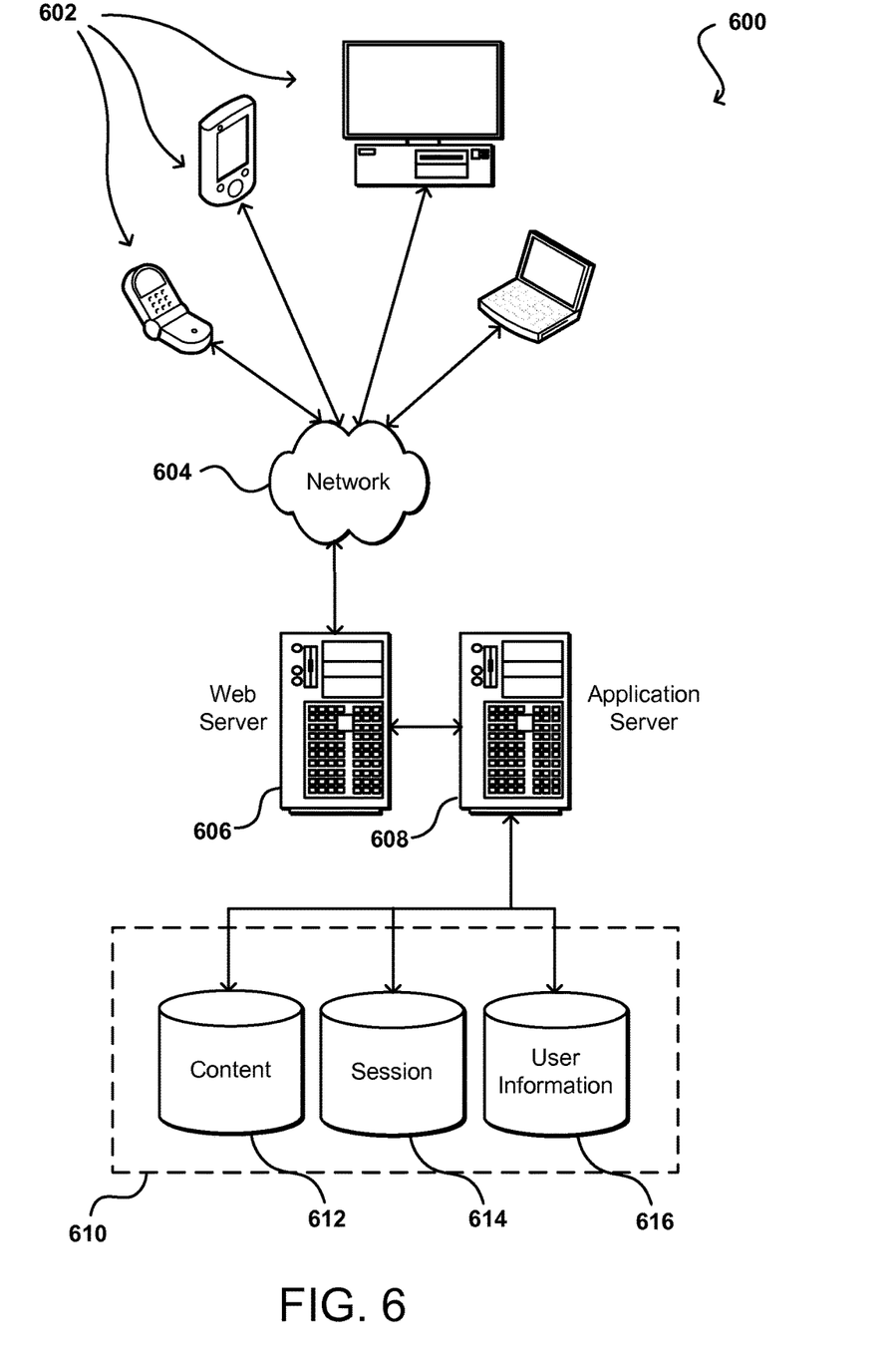
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor of a computing device, cause the computing device to:
   capture a first image;
   analyze the first image to determine a position of an object relative to a plurality of gesture sensors of the computing device;
   determine a first gesture sensor, of the plurality of gesture sensors of the computing device, having the object in a first field of view of the first gesture sensor;
   cause the first gesture sensor to be in an activate state and other gesture sensors of the plurality of gesture sensors to be in a deactivated state;
   capture one or more additional images of the object using the first gesture sensor while the object is in the first field of view of the first gesture sensor;
   track motion of the object relative to the computing device by analyzing the one or more additional images captured using the first gesture sensor;
   determine that the object is approaching a second field of view of a second gesture sensor of the plurality of gesture sensors; and
   cause the second gesture sensor to be in the active state when the object, determined to be approaching the second field of view, satisfies at least one activation criterion for the second gesture sensor, the activation criterion including at least determining the object will enter the second field of view within a predetermined period of time associated with the second gesture sensor, wherein the computing device is configured to track motion of the object between the first field of view and the second field of view.

2. The non-transitory computer-readable storage medium of claim 1, wherein the at least one activation criterion further includes at least one of the object passing into the second field of view, or passing within a determined distance of the second field of view.

3. The non-transitory computer-readable storage medium of claim 1, wherein the instructions when executed further cause the computing device to:
capture the first image using a camera separate from the plurality of gesture sensors on the computing device.

4. The non-transitory computer-readable storage medium of claim 1, wherein the instructions when executed further cause the computing device to:
cause the first gesture sensor to enter the deactivated state after the object is located in the second field of view of the second gesture sensor.

5. A computer-implemented method, comprising:
determining a position of an object relative to a plurality of image capture elements of a computing device;
causing a first image capture element, of the plurality of image capture elements on the computing device, to capture one or more images of the object to determine a new position of the object, relative to the first image capture element of the computing device, over a period of time, the new position of the object being within a first field of view of the first image capture element;
determining, based at least in part upon analyzing the one or more images captured by the first image capture element, that the object, with respect to the first image capture element of the computing device, is moving toward a second field of view of a second image capture element and will enter the second field of view within a predetermined period of time associated with the second image capture element; and
causing the second image capture element, of the plurality of image capture elements, to be in an active state to capture one or more subsequent images to enable determination of where the object is while the object is in the second field of view.

6. The computer-implemented method of claim 5, further comprising:
determining whether motion of the object meets at least one activation criterion before causing the second image capture element to enter the active state.

7. The computer-implemented method of claim 6, wherein the at least one activation criterion further includes at least one of passing into the second field of view, or passing within a determined distance of the second field of view.

8. The computer-implemented method of claim 7, further comprising:
analyzing at least one of a position, a velocity, an acceleration, or a direction of movement to predict, for a current path of motion of the object, a determined amount of time in which the object is likely to enter the second field of view.

9. The computer-implemented method of claim 5, further comprising:
causing the first image capture element to enter a low power state after the object is determined to be within the second of field of view and the second image capture element is in the active state.

10. The computer-implemented method of claim 5, further comprising:
activating at least a third image capture element when a predicted range of motion of the object includes at least a third field of view of the at least a third image capture element.

11. The computer-implemented method of claim 5, wherein a plurality of fields of view for the plurality of image capture elements at least partially overlaps with at least one other field of view of the plurality of fields of view, wherein the computing device has a larger effective field of view than any of the plurality of fields of view and there are no dead zones within the effective field of view.

12. The computer-implemented method of claim 5, wherein the computing device is configured to capture stereoscopic images to determine the relative position of the object in three dimensions, and wherein at least two of the image capture elements are in the active state at any time to track movement of the object in the three dimensions.

13. The computer-implemented method of claim 5, wherein the object is at least one of a hand, a head, a finger, or a facial feature of a user, or an object being held by the user.

14. A computing device, comprising:
at least one processor;
a plurality of cameras; and
memory including instructions that, when executed by the at least one processor, cause the computing device to:
cause a first camera, of the plurality of cameras, to capture one or more images of a feature to determine motion of the feature while the feature is within a first field of view of the first camera;
determine, based at least in part upon analyzing the one or more images, that the feature is moving toward a second field of view of a second camera of the plurality of cameras;
cause the second camera to capture one or more subsequent images to enable determination of motion of the feature while the feature is in the second field of view;
determine an amount of time needed for the feature to move into the second field of view based at least in part upon a rate of motion of the feature with respect to the computing device;
compare the amount of time to a latency period of the second camera; and
instruct the second camera to enter an active state when the amount of time needed for the feature to move into the second field of view at least meets the latency period.

15. The computing device of claim 14, wherein the instructions when executed further cause the computing device to:
capture an initial image using at least one camera of the plurality of cameras; and
analyze the initial image to recognize the feature and determine an initial relative position of the feature with respect to the computing device, the initial relative position determining the first field of view.

16. The computing device of claim 14, wherein the instructions when executed further cause the computing device to:
cause the first camera to enter a low power state when changes in the relative position of the feature are being determined using the second camera.

17. The computing device of claim 14, wherein the instructions when executed further cause the computing device to:

cause the second camera to enter a standby state if the feature does not enter the second field of view for at least a determined amount of time.

18. The computing device of claim 14, wherein the instructions when executed further cause the computing device to:

update a display of information for the feature based at least in part upon a current relative position of the feature with respect to the computing device.

19. The computing device of claim 14, wherein the instructions when executed further cause the computing device to:

track relative motion of the feature with respect to the computing device using a fast correlation tracking algorithm.

20. The computing device of claim 19, wherein the instructions when executed further cause the computing device to:

model the relative motion using at least one of a Kalman filter or a linear quadratic estimation process.

* * * * *